(12) United States Patent
Kanbe et al.

(10) Patent No.: US 7,252,307 B2
(45) Date of Patent: Aug. 7, 2007

(54) TENSION DETECTING DEVICE

(75) Inventors: Masakata Kanbe, Aichi (JP); Kazuhito Matsui, Aichi (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 408 days.

(21) Appl. No.: 10/838,647

(22) Filed: May 5, 2004

(65) Prior Publication Data

US 2005/0001418 A1    Jan. 6, 2005

(30) Foreign Application Priority Data

May 8, 2003   (JP) .............................. 2003-130164

(51) Int. Cl.
*B60R 22/00*   (2006.01)
(52) U.S. Cl. .............................. 280/801.1; 73/862.391
(58) Field of Classification Search ..............................
73/862.391–862.393; 280/801.1, 805; 297/470–472
See application file for complete search history.

(56) References Cited

U.S. PATENT DOCUMENTS

| | | | | | |
|---|---|---|---|---|---|
| 3,817,093 | A | * | 6/1974 | Williams | ................ 73/862.474 |
| 4,130,014 | A | * | 12/1978 | Eddens | ................... 73/862.474 |
| 4,542,800 | A | * | 9/1985 | Knothe et al. | ............... 177/211 |
| 6,360,596 | B1 | * | 3/2002 | Callendrier | ................... 73/159 |
| 6,450,534 | B1 | * | 9/2002 | Blakesley et al. | ........ 280/801.1 |
| 6,583,367 | B2 | * | 6/2003 | Wolfe et al. | ................. 177/136 |
| 6,634,235 | B2 | * | 10/2003 | Maeda et al. | .................. 73/781 |
| 6,647,811 | B2 | * | 11/2003 | Blakesley et al. | ...... 73/862.391 |
| 2001/0054323 | A1 | | 12/2001 | Faigle et al. | |
| 2002/0043795 | A1 | | 4/2002 | Lichtinger et al. | |
| 2002/0059840 | A1 | * | 5/2002 | Houston et al. | ........ 73/862.474 |

OTHER PUBLICATIONS

European Search Report dated Aug. 9, 2004.

* cited by examiner

*Primary Examiner*—Paul N. Dickson
*Assistant Examiner*—Laura B Freedman
(74) *Attorney, Agent, or Firm*—Roberts, Mlotkowski & Hobbes; Thomas W. Cole

(57) ABSTRACT

An end portion of a webbing belt is attached to a metal base plate, in which a hole is formed. A projecting portion is formed at an inner edge of the hole which inner edge is at a side opposite a belt attachment portion. When tension is applied to the webbing belt, due to a fixed plate engaging with the projecting portion, a tensed portion of the metal base plate between the belt attachment portion and the hole extends and the projecting portion contracts in the direction of the tension. As a result, first strain gauges mounted to the tensed portion output a signal corresponding to extension, and second strain gauges mounted to the projecting portion output a signal corresponding to contraction. A tension detecting device detects the tension on the basis of a large difference in outputs of the first strain gauges and the second strain gauges.

12 Claims, 3 Drawing Sheets

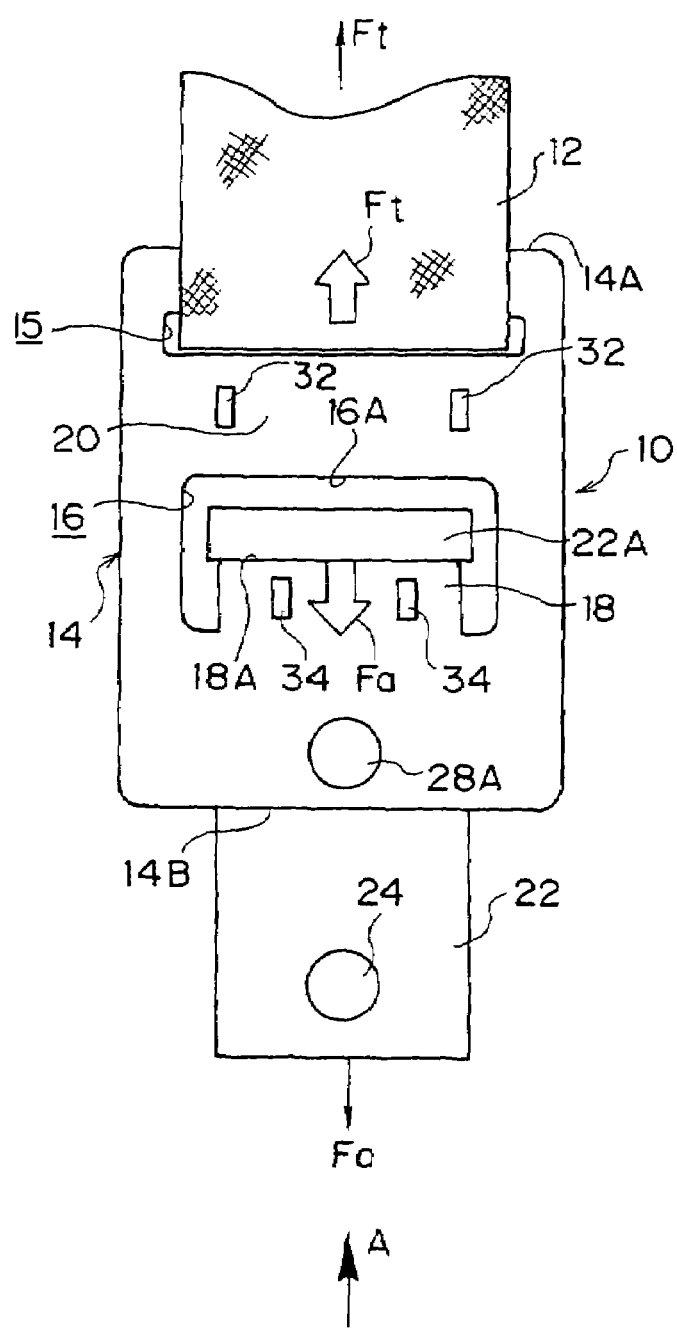
FIG. IA
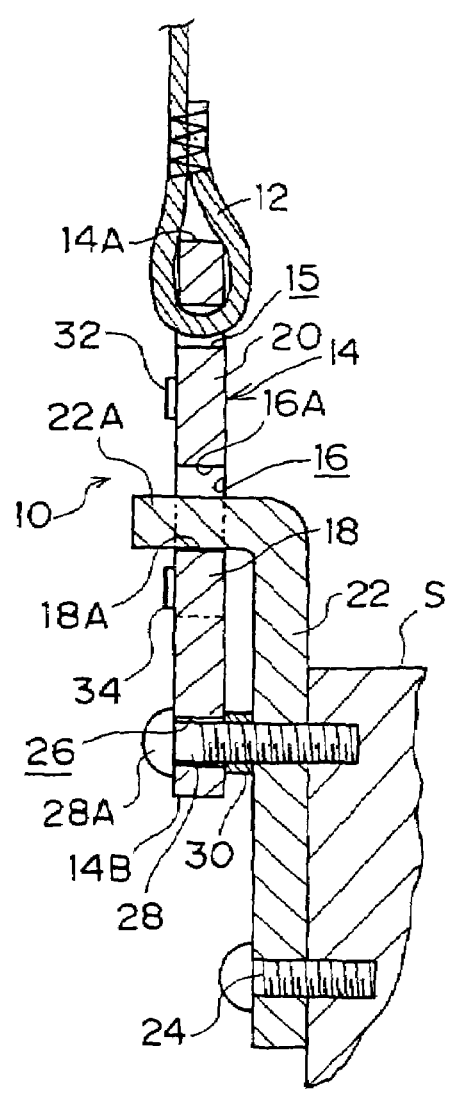
FIG. IB

TENSION DETECTING DEVICE

CROSS-REFERENCE TO RELATED APPLICATION

This application claims priority under 35 USC 119 from Japanese Patent Application No. 2003-130164, the disclosure of which is incorporated by reference herein.

BACKGROUND OF THE INVENTION

1. Field of the Invention

The present invention relates to a tension detecting device which detects the tension of a belt such as, for example, a webbing belt structuring a seat belt device of a vehicle, or the like.

2. Description of the Related Art

Vehicles such as automobiles and the like are equipped with so-called seat belt devices which restrain, by an elongated, strip-shaped webbing belt, the body of a vehicle occupant who is seated in a seat. Further, vehicles are equipped with so-called air bag devices which, when the vehicle rapidly decelerates or the like, expand and unfold a bag body in front of the vehicle occupant seated in the seat, such that the bag body catches the body of the vehicle occupant which is attempting to move toward the front of the vehicle due to inertia.

Such seat belt devices are not only for use in restraining the body of a vehicle occupant. For example, there are cases in which the seat belt device is used to fix a child seat which is set on a seat and which is used for the seating of a child passenger.

When a child seat is fixed on a seat, it is preferable for the air bag device corresponding to the seat where the child seat is fixed to not deploy. Thus, usually, a switch for prohibiting deployment of an air bag device is provided at the vehicle. When a child seat is fixed to a seat, the driver operates the switch so as to prohibit deployment of the air bag device. However, in a structure having such a switch which is operated manually, the switch must be operated each time the child seat is installed or removed, and operation of the switch is bothersome.

Thus, detecting devices for automatically detecting the absence/presence of installation of a child seat and prohibiting deployment of the air bag device have been desired. A seat belt tension measuring system (hereinafter called "tension detecting device") is known which, on the basis of the tension applied to the webbing belt, detects whether or not a child seat is installed. (See, for example, US Patent Publication of Application No. 2002/0043795A1.)

Namely, in a seat belt device, in order to alleviate the constrained sensation of the vehicle occupant in the usual state in which the webbing is applied to him/her, the webbing loosely restrains the vehicle occupant, and the tension applied to the webbing belt is small. On the other hand, when a child seat is installed, in order to impede movement of the child seat itself due to the vehicle accelerating, the seat belt device strongly holds and restrains the child seat, and the tension applied to the webbing belt is great.

The tension detecting device disclosed in US Patent Publication of Application No. 2002/0043795A1 is applied to the above-described seat belt device. In order to detect the tension applied to the webbing belt, the tension detecting device is structured such that a strain gauge is mounted to a metal plate. One end portion of the metal plate is fixed to a structural member of the vehicle, whereas tension of the webbing belt is applied to the other end portion of the metal plate. The strain gauge is a full-bridge strain gauge having four grids. In accordance with the extension of the metal plate in the direction of tension due to the tension and the contraction in the direction orthogonal to the direction of tension, the strain gauge outputs a signal corresponding to the tension applied to the metal plate, i.e., to the webbing belt (namely, the strain gauge measures or detects the tension).

The tension detecting device outputs the signal corresponding to the tension to a control unit of the air bag device. The control unit prohibits operation of the air bag device when the signal (the tension of the webbing belt) exceeds a threshold value set in advance, i.e., when a tension value corresponding to a state in which a child seat is installed is inputted.

However, in a conventional tension detecting device such as that described above, the tension is detected on the basis of the extension of the metal plate in the direction of the tension (longitudinal strain) and the contraction in the direction orthogonal to the direction of the tension (lateral strain). In other words, the lateral strain which is smaller (determined by Poisson's ratio) than the longitudinal strain is used to detect the tension. Therefore, the difference in the outputs of the extension and the contraction (the difference in the amplitudes of the changes of the electrical resistance values) is small, and a problem arises in that the tension detecting sensitivity is poor.

SUMMARY OF THE INVENTION

An object of the present invention is to provide a tension detecting device which can detect, with high sensitivity, the tension applied to a belt member.

A first aspect of the present invention is a tension detecting device detecting tension applied in a longitudinal direction of a strip-shaped belt member, the device comprising: a detected member attached to the belt member, and elastically deforming when the tension is applied; a first detector mounted to the detected member, and outputting a signal corresponding to extension of the detected member in a direction of the tension due to the tension; and a second detector mounted to the detected member, and outputting a signal corresponding to contraction of the detected member in the direction of the tension due to the tension, wherein the tension detecting device detects the tension applied to the belt member on the basis of outputs from the first detector and the second detector.

In the tension detecting device of the above-described aspect, when tension in the longitudinal direction is applied to the elongated, strip-shaped belt member, the detected member attached to the belt member elastically deforms due to the tension. The first detector, which is mounted to the detected member, outputs a signal corresponding to the extension of the detected member along the direction of the tension. Similarly, the second detector, which is mounted to the detected member, outputs a signal corresponding to the contraction of the detected member along the direction of the tension.

Namely, the first and second detectors output signals which correspond to the tensions applied to the detected member, and which are in directions opposite to one another with respect to a reference value (an output at the time when there is no tension). Thus, the greater the difference in the outputs of the first and second detectors, the better the sensitivity of detecting the tension applied to the detected member, i.e., the belt member. Further, at the present tension detecting device, the first and second detectors detect the strain (deformation) at the detected member in directions along the direction of the tension. In other words, the first and second detectors both detect the longitudinal strain, which is greater than the lateral strain. Therefore, the difference in the outputs of the first and second detectors is great, and the tension applied to the belt member can be detected with high sensitivity.

In this way, in the tension detecting device of the above-described aspect, the tension applied to a belt member can be detected with high sensitivity.

Further, a second aspect of the present invention is a tension detecting device detecting tension applied in a longitudinal direction of a strip-shaped belt member, the device comprising: a detected base plate formed in a shape of a plate having a hole passing therethrough in a direction of thickness thereof, the detected base plate having, at a position set apart from the hole, a belt member attachment region to which the belt member is attached, and due to an edge portion of the hole, which edge portion is at a side opposite the belt member attachment region, engaging with an engaging member, the detected base plate resists tension applied to the belt member; a first strain gauge mounted to the detected base plate between the hole and the belt member attachment region, and causing its own electrical resistance value to increase in accordance with extension of the detected base plate due to tension; and a second strain gauge mounted to a region of the detected base plate which region is at a side of the hole opposite a side where the belt member attachment region is located, and causing its own electrical resistance value to decrease in accordance with contraction of the detected base plate due to the tension.

In the tension detecting device of the above-described second aspect, the detected base plate having the hole is attached to the belt member at a position set apart from the hole. The edge portion of the hole, which edge portion is at the side opposite the belt member attaching side, engages with an engaging member. In this way, when tension in the longitudinal direction is applied to the belt member, the tension is borne (is supported) at the engaging member via the detected base plate. At this time, the detected base plate elastically deforms such that the portion of the detected base plate between the hole and the belt member attachment region extends, and the portion of the detected base plate between the edge portion of the hole which the engaging member engages and the end portion at the side opposite the belt member side contracts. The first strain gauge increases its own electrical resistance value in accordance with the extension of the portion of the detected base plate between the hole and the belt member attachment region. The second strain gauge decreases its own electrical resistance value in accordance with the contraction of the portion between the edge portion of the hole and the end portion at the side opposite the belt member side.

Namely, the first and second strain gauges output signals which correspond to the tension applied to the detected base plate and which are in the mutually opposite directions of the respective electrical resistance values thereof increasing or decreasing. Therefore, the greater the difference in the outputs of the first and second strain gauges, the better the sensitivity of detecting the tension applied to the detected base plate, i.e., the belt member. Further, at the present tension detecting device, the first and second strain gauges detect the strain (deformation) at the detected base plate in directions along the direction of the tension. In other words, the first and second strain gauges both detect the longitudinal strain, which is greater than the lateral strain. Therefore, the difference in the outputs of the first and second strain gauges is great, and the tension applied to the belt member can be detected with high sensitivity.

In this way, in the tension detecting device of the above-described aspect, the tension applied to a belt member can be detected with high sensitivity. Moreover, because this tension detecting device is structured by a plurality of strain gauges being mounted to a detected base plate, the tension detecting device can be made to be thin.

In the above-described tension detecting device relating to the second aspect, a projecting portion, which projects toward an inner side of the hole along a direction of the tension, may be provided at the detected base plate, and the second strain gauge may be mounted to the projecting portion.

By utilizing such a structure, the projecting portion, to which the second strain gauge is mounted and which contracts due to the tension, is provided so as to project toward the inner side of the hole at the metal base plate. In other words, the cross-sectional area, orthogonal to the direction of the tension, of the projecting portion which is the portion of the metal base plate which contracts due to tension, is small. Therefore, the width of the decrease in the electrical resistance value which is the output of the second strain gauge, i.e., the difference in the outputs of the first and second strain gauges, is even larger, and the tension applied to the belt member can be detected with even greater sensitivity.

Moreover, in the tension detecting devices of the above-described aspects, two of the first strain gauge and two of the second strain gauge may be mounted to the single detected base plate, and a Wheatstone bridge may be structured by disposing the two first strain gauges at opposing sides and the two second strain gauges at two other opposing sides.

In this tension detecting device, two of the first strain gauges and two of the second strain gauges are mounted to the detected base plate. The total four strain gauges structure a Wheatstone bridge by the two first strain gauges being disposed at opposing sides and the two second strain gauges being disposed at other opposing sides. In this way, with a simple circuit structure, the signal is outputted as if the difference in the outputs of the first and second strain gauges were amplified. Therefore, the tension applied to the belt member can be detected with even higher sensitivity.

A third aspect of the present invention is a tension detecting device detecting tension applied in a longitudinal direction of a belt, the device comprising: an elastically deformable member attached to the belt so as to elastically deform in accordance with tension when the tension is applied to the belt; a first strain detector mounted to the elastically deformable member, and outputting a signal corresponding to extension of the elastically deformable member in a direction of the tension when the tension is applied to the elastically deformable member; and a second strain detector mounted to the elastically deformable member, and outputting a signal corresponding to contraction of the elastically deformable member in the direction of the tension when the tension is applied to the elastically deformable member, wherein the tension detecting device detects the tension applied to the belt on the basis of outputs from the first strain detector and the second strain detector.

BRIEF DESCRIPTION OF THE DRAWINGS

FIGS. 1A and 1B are drawings showing the overall schematic structure of a tension detecting device relating to an embodiment of the present invention, where FIG. 1A is a front view and FIG. 1B is a side sectional view.

DETAILED DESCRIPTION OF THE INVENTION

Figure 2:
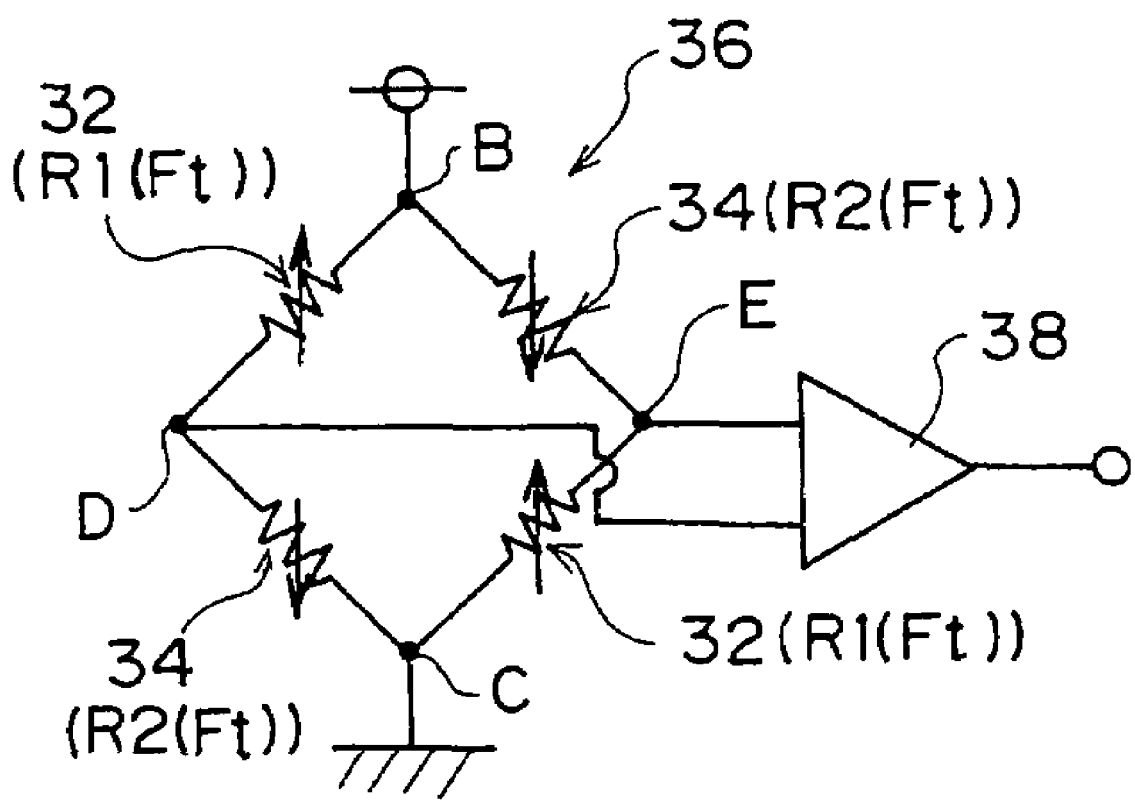
FIG. 2 is a circuit diagram showing the schematic circuit structure of respective strain gauges structuring the tension detecting device relating to the embodiment of the present invention.

A tension detecting device 10 relating to a first embodiment of the present invention will be described on the basis of FIGS. 1A, 1B and 2.

A front view of the tension detecting device 10 is shown in FIG. 1A. A side sectional view of the tension detecting device 10 is shown in FIG. 1B.

The tension detecting device 10 is applied to, for example, a seat belt device provided in a vehicle such as an automobile or the like. The tension detecting device 10 detects tension Ft in the longitudinal direction of a webbing belt 12, which tension Ft is applied to the webbing belt 12. The webbing belt 12 is for restraining the body of a vehicle occupant and serves as a belt member structuring the seat belt device.

As shown in FIGS. 1A and 1B, the tension detecting device 10 has a metal base plate 14 which serves as a detected member or a detected base plate. The outer configuration (the configuration of the outer edge) of the metal base plate 14 is substantially rectangular. The metal base plate 14 has an engaging hole 16 which serves as a hole and which passes through the substantially central portion of the metal base plate 14 along the direction of plate thickness thereof. The metal base plate 14 is formed so as to be symmetrical with respect to a center line (not illustrated) which runs along the direction of arrow A which coincides with the direction of the tension Ft. An end portion of the webbing belt 12 is attached to one end portion 14A side of the metal base plate 14. Specifically, an end portion of the webbing belt 12, which end portion is formed in an annular form, is irremovably inserted through an attachment hole 15 which is provided between the engaging hole 16 and the one end portion 14A. In this way, when the tension Ft is applied, the webbing 12 pulls the edge portion of the attachment hole 15 which edge portion is at the one end portion 14A side.

A projection portion 18, which projects toward the inner side of the engaging hole 16 from another end portion 14B side of the metal base plate 14 (the side opposite the one end portion 14A), is formed integrally with the metal base plate 14. Namely, the engaging hole 16 is formed in a substantial U shape which opens toward the other end portion 14B side in front view, so as to surround the projecting portion 18. In other words, the outer edge of the projecting portion 18 forms a portion of the inner edge of the engaging hole 16.

The distal end portion of the projecting portion 18, which is an edge portion parallel to the one end portion 14A side edge portion of the attachment hole 15, is an engaging surface 18A. The portion at the metal base plate 14 between an inner edge portion 16A of the engaging hole 16, which opposes the engaging surface 18A, and (the engaging hole 16 side edge portion of) the attachment hole 15, which is the region of connection with the webbing belt 12, is a tensed portion 20.

An engaging portion 22A of a fixed plate 22 which serves as an engaging member is set in the engaging hole 16 in a state of passing therethrough. The fixed plate 22 is fixed, at one end portion thereof to a vehicle structural member S by a bolt 24. The engaging portion 22A, which is positioned at the other end portion of the fixed plate 22, abuts the engaging surface 18A of the projecting portion 18.

When tension Ft in the direction of arrow A is applied to the webbing belt 12, the tension Ft is borne (is supported) at the fixed plate 22 via the metal base plate 14. During the time while the tension Ft is being applied, the portion of the metal base plate 14 including the tensed portion 20 elastically extends, and the projecting portion 18, to which drag Fa which resists the tension Ft is applied via the engaging portion 22A, elastically contracts (is contracted by pressure).

A through hole 26 is formed in the other end portion 14B side of the metal plate 14. A bolt 28, which passes through the through hole 26, also passes through the fixed plate 22, and is screwed in and fixed to the vehicle structural member S. A head portion 28A of the bolt 28 slightly contacts and engages with the surface of the metal base plate 14 around the through hole 26. A washer 30, through which the bolt 28 is inserted, is disposed between the metal base plate 14 and the fixed plate 22.

In this way, the metal base plate 14 is held at a position at which the engaging portion 22A abuts (engages with) the engaging surface 18A of the projecting portion 18, in a state in which the metal base plate 14 is prevented from falling off from the fixed plate 22 and the metal base plate 14 faces the fixed plate 22 without contacting it. In this state, the metal base plate 14 can move, with respect to the fixed plate 22, in the direction of arrow A and in the direction opposite thereto. In other words, the tension Ft is not applied to the bolt 28, and therefore, compression deformation of the projecting portion 18 due to the tension Ft arises.

Further, the tension detecting device 10 has first strain gauges 32 serving as first detectors and second strain gauges 34 serving as second detectors. Both the first strain gauges 32 and the second strain gauges 34 are mounted to the metal base plate 14. Each of the first strain gauges 32 and the second strain gauges 32 is structured by a thick-film resistor, a thin-film resistor, or a semiconductor strain gauge, and due to the piezo effect, causes its own electrical resistance value to vary in accordance with strain. The change in the electrical resistance value is an increase for strain in the extending direction, and is a decrease for strain in the contracting direction.

Two of the first strain gauges 32 are provided and are mounted to the tensed portion 20 of the metal base plate 14. Similarly, two of the second strain gauges 34 are provided and are mounted to the projecting portion 18 of the metal base plate 14. The first strain gauges 32 are, and the second strain gauges 34 are disposed symmetrically across a central line of the metal base plate 14 which runs along the direction of arrow A in front view.

The first strain gauges 32 and the second strain gauges 34 are electrically connected as shown in FIG. 2, so as to structure a Wheatstone bridge 36. Specifically, the two first strain gauges 32 are disposed at opposite sides from one another, and the two second strain gauges 34 are disposed at the remaining opposite sides, so as to form the Wheatstone bridge 36. The Wheatstone bridge 36 is energized between B and C which are opposite angles, and output is obtained from between D and E which are the remaining opposite angles. This output is inputted to an amplifier 38, and is outputted from the amplifier 38 to an unillustrated air bag ECU (electrical control unit).

The output signal of the Wheatstone bridge 36 is a signal corresponding to the tension Ft applied to the metal base plate 14, i.e., the webbing belt 12. Specifically, given that the electrical resistance value of each of the first strain gauges 32 is R1(Ft) and the electrical resistance value of each of the second strain gauges 34 is R2(Ft), the output signal from the Wheatstone bridge 36, i.e., the tension detecting device 10, is a voltage signal which is proportional to $2 \times \{\Delta R1(Ft) - \Delta R2(Ft)\}$. Note that the output signal of the Wheatstone bridge 36 is set to be zero when the tension Ft is not being applied to the webbing belt 12.

The air bag ECU, to which is inputted the output signal of the tension detecting device 10 corresponding to the tension Ft, compares this signal with a preset threshold value. When the signal is greater than the threshold value, the air bag ECU prohibits operation of the air bag device corresponding to the seat having the seat belt device to which that tension detecting device is applied. This threshold value is smaller than a value corresponding to the tension Ft (the range of tensions Ft) applied to the webbing belt 12 which is holding and restraining a child seat, and is sufficiently larger than a value corresponding to the tension Ft applied to the webbing belt 12 which is restraining a vehicle occupant.

Note that the fixed plate 22 may be, for example, an anchor plate which fixedly holds one end portion of the webbing belt 12 in a three-point seat belt device. As another example, the fixed plate 22 may be the proximal portion of a buckle device, and the metal base plate 14 may be structured as the lock plate of the buckle device to which the tension Ft is transmitted and which engages with a tongue plate through which the intermediate portion of the webbing belt 12 is inserted.

Next, operation of the present embodiment will be described.

In the tension detecting device 10 having the above-described structure, when tension Ft along the direction of arrow A which is the longitudinal direction of the webbing belt 12 is applied to the webbing belt 12, the tensed portion 20 of the metal base plate 14 extends in the direction of arrow A, and the projecting portion 18 contracts in the direction opposite to the direction of arrow A. Accompanying this deformation of the metal base plate 14, the respective electrical resistance values R1(Ft) of the first strain gauges 32 increase in accordance with the tension Ft, whereas the respective electrical resistance value R2(Ft) of the second strain gauges 34 decrease in accordance with the tension Ft.

Thus, a signal proportional to $2 \times \{\Delta R1(Ft) - \Delta R2(Ft)\}$, i.e., a detection signal corresponding to the tension Ft applied to the webbing belt 12, is outputted to the air bag ECU from between the opposite angles DE of the Wheatstone bridge 36 which is energized between the opposite angles BC, i.e., is outputted from the tension detecting device 10. At the air bag ECU, it is judged, on the basis of this signal, whether or not the air bag can be operated.

When the detection signal of the tension detecting device 10 is smaller than the above-described threshold value, operation of the air bag device is permitted under the condition that it is not prohibited by other control parameters. On the other hand, when the detection signal of the tension detecting device 10 is larger than the threshold value, operation of the air bag device is prohibited regardless of other control parameters.

Here, the first strain gauges 32 detect the extension of the metal base plate 14 along the direction of arrow A, and the second strain gauges 34 detect the contraction of the metal base plate 14 along the direction of arrow A (but oriented oppositely). Therefore, the tension applied to the metal base plate 14 can be detected with high sensitivity from the difference in the outputs of the first strain gauges 32 and the second strain gauges 34 (a large output signal value is obtained). Specifically, the strain (deformation) in the direction of arrow A at the metal base plate 14 is detected by the first strain gauges 32 and the second strain gauges 34 respectively. In other words, the first strain gauges 32 and the second strain gauges 34 both detect the longitudinal strain which is larger than the lateral strain. Therefore, the difference in the outputs of the first strain gauges 32 and the second strain gauges 34 is large, and the tension applied to the metal base plate 14, i.e., the webbing belt 12, can be detected with high sensitivity.

In particular, the Wheatstone bridge 36 is structured by the two first strain gauges 32 and the two second strain gauges 34. Therefore, as if the difference in the outputs of the first strain gauges 32 and the second strain gauges 34 were amplified, an output signal proportional to $2 \times \{\Delta R1(Ft) - \Delta R2(Ft)\}$ is obtained, and the sensitivity of detecting the tension is even higher. Further, by using the Wheatstone bridge 36, the circuit processing of the four strain gauges 32, 34 is easy (the circuit structure is simple).

In the tension detecting device 10 having the above-described structure, the noise component in the output signal is small, and the amplification factor of the signal by the amplifier 38 can thereby be kept low. Therefore, the S/N ratio improves. Accordingly, it is difficult for the output signal to be affected by external noise, and the tension detecting device 10 which is strong with respect to external noise is obtained.

Moreover, in the tension detecting device 10, the two first strain gauges 32 and the two second strain gauges 34 are mounted to the metal base plate 14 which is flat-plate-shaped. The tension detecting device 10 can thereby be structured to be planar on the whole, and thus, can be made to be thin. In this way, there are fewer constraints on the placement of the tension detecting device 10, and the degrees of freedom in the layout increase.

In this way, in the tension detecting device 10 relating to the present embodiment, the tension Ft applied to the webbing belt 12 can be detected with high sensitivity.

Next, a tension detecting device 50 relating to a modified example of the present embodiment will be described. Parts and portions which are basically the same as those of the above-described embodiment are denoted by the same reference numerals as in the above-described embodiment, and description thereof is omitted.

Figure 3:
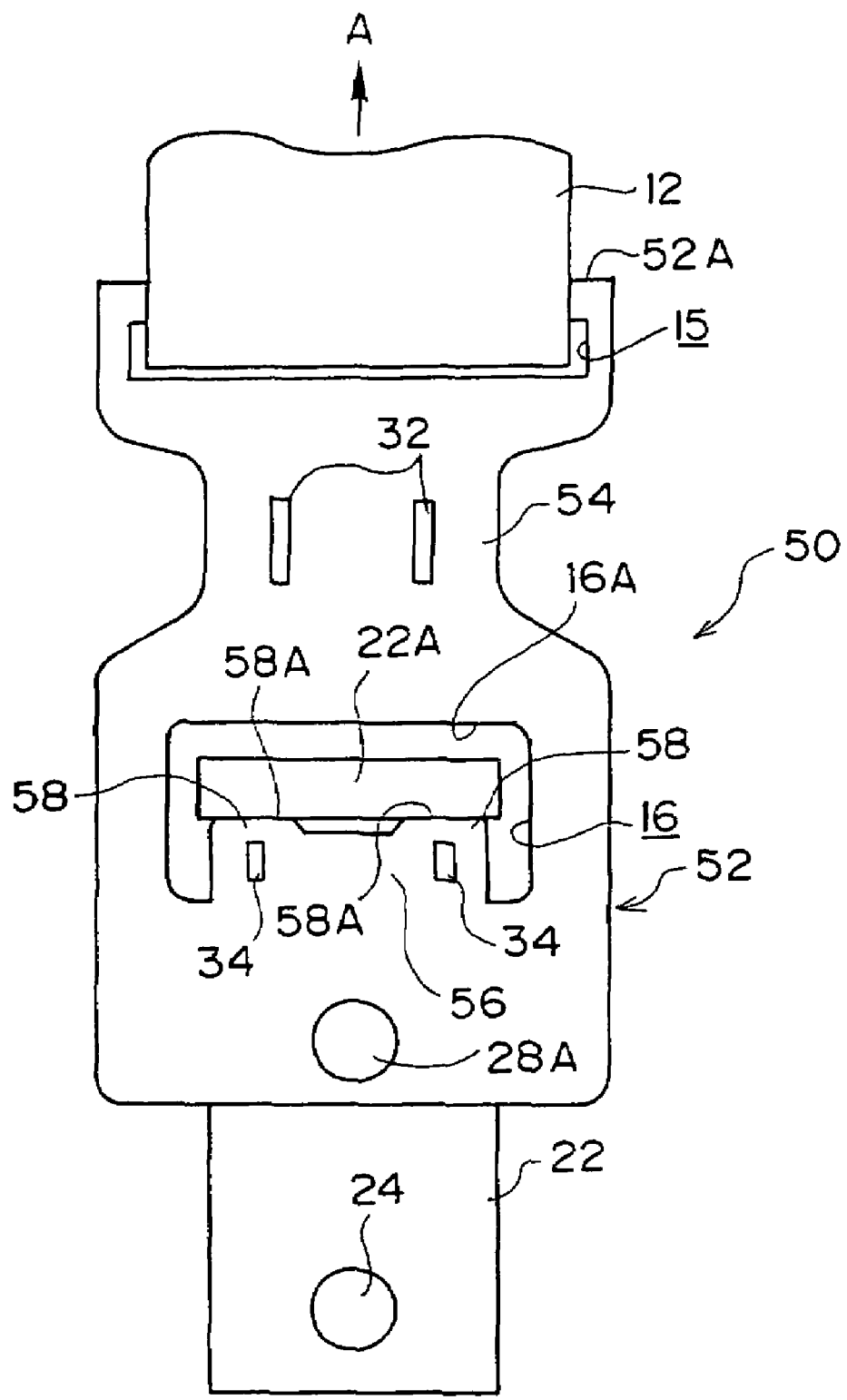
FIG. 3 is a front view showing the overall schematic structure of a tension detecting device relating to a modified example of the embodiment of the present invention.

As shown in FIG. 3, the tension detecting device 50 differs from the tension detecting device 10 with regard to the point that the tension detecting device 50 has a metal base plate 52 instead of the metal base plate 14. A tensed portion 54 of the metal base plate 52, which is the portion between the engaging hole 16 and the attachment hole 15 (one end portion 52A) to which the webbing belt 12 is attached, is formed to be more narrow than other portions. Namely, the cross-sectional area of the tensed portion 54 in a direction orthogonal to the direction of arrow A is smaller than that of the tensed portion 20 in the above-described embodiment. It is easy for the tensed portion 54 to extend in the direction of arrow A, and, at the same tension Ft, the tensed portion 54 extends more than the tensed portion 20. The two first strain gauges 32 are mounted to the tensed portion 54 so as to have axial symmetry.

The metal base plate 52 has, in place of the projecting portion 18, a projecting portion 56. A pair of engaging convex portions 58, which are formed as if a portion of the projecting portion 56 has been cut out from the surface side thereof corresponding to the engaging surface 18A, are formed at the projecting portion 56. The distal ends of the engaging convex portions 58 facing in the direction of arrow A are engaging surfaces 58A, and abut (engage with) the engaging portion 22A of the fixed plate 22. In this way, the projecting portion 56 is formed in a shape at which it is easy for stress to concentrate, and the compressive strain due to the same tension Ft is greater than that at the projecting portion 18 in the above-described embodiment. The second strain gauges 34 are mounted to the projecting portion 56 beneath the engaging convex portions 58 respectively.

In the tension detecting device 50 relating to the present modified example, the exact same effects as those of the tension detecting device 10 relating to the above-described embodiment are achieved, and further, the sensitivity of detecting the tension is improved even more because the strains of the tensed portion 54 and the projecting portion 56 in directions along the direction of arrow A due to the tension Ft are respectively large. Note that, even if the first strain gauges 32 are disposed at the metal base plate 14 at the sides of the engaging hole 16 which are narrow portions, the sensitivity of detecting the tension is improved even more, in the same way as in the present modified example.

The above-described embodiment and modified example are preferable structures in which the tension detecting devices 10, 50 have two of the first strain gauges 32 and two of the second strain gauges 34. However, the present invention is not limited to the same. For example, the tension detecting device 10 or the like may be structured to have one of the first strain gauges 32 and one of the second strain gauges 34. In this case, by structuring a half-bridge circuit of a Wheatstone bridge by the first strain gauge 32 and the second strain gauge 34, it is possible to obtain a large output signal which corresponds to the difference in the outputs of the first strain gauge 32 and the second strain gauge 34.

The above-described embodiments are preferable structures in which the tension detecting devices 10, 50 are provided with the flat-plate-shaped metal base plates 14, 52 as the detected members. However, the present invention is not limited to the same, and it suffices for the detected member to receive tension and elastically deform. For example, the detected member may be formed of a resin material or the like, or may be formed in the shape of a block or in the shape of a rod.

In the above-described embodiment and modified example, the fixed plate 22 is fixed to the vehicle structural member S. However, the present invention is not limited to the same. For example, one portion of the webbing belt 12 which is divided in two may be attached to the metal base plate 14 or the like, and the other portion of the webbing belt 12 may be attached to the fixed plate 22. Further, instead of the fixed plate 22, the aforementioned other portion of the webbing belt 12 may be trained on and engaged with the projecting portions 18, 56 (which serve as the engaging members in the present invention). In these structures, the tension detecting device 10 or the like can be disposed at a desired position at the longitudinal direction intermediate portion of the webbing belt 12 (e.g., between the retractor and the through anchor, or the like).

In addition, the above-described embodiments are preferable structures in which the first strain gauges 32 and the second strain gauges 34 are respectively a thick-film resistor, a thin-film resistor, or a semiconductor strain gauge. However, the present invention is not limited to the same, and the first strain gauges 32 and second strain gauges 34 may be strain gauges of any type.

As described above, the tension detecting device relating to the present invention has the excellent effect that it can detect, with high sensitivity, the tension applied to a belt member.

What is claimed is:

1. A tension detecting device detecting tension applied in a longitudinal direction of a strip-shaped belt member, the device comprising:
 a detected base plate formed in a shape of a plate having a hole passing therethrough in a direction of thickness thereof, the detected base plate having, at a position set apart from the hole, a belt member attachment region to which the belt member is attached, and due to an edge portion of the hole, which edge portion is at a side opposite the belt member attachment region, engaging with an engaging member, the detected base plate resists tension applied to the belt member;
 a first strain gauge mounted to the detected base plate between the hole and the belt member attachment region, and causing its own electrical resistance value to increase in accordance with extension of the detected base plate due to tension; and
 a second strain gauge mounted to a region of the detected base plate which region is at a side of the hole opposite a side where the belt member attachment region is located, and causing its own electrical resistance value to decrease in accordance with contraction of the detected base plate due to the tension.

2. The tension detecting device of claim 1, wherein a projecting portion, which projects toward an inner side of the hole along a direction of the tension, is provided at the detected base plate, and the second strain gauge is mounted to the projecting portion.

3. The tension detecting device of claim 1, wherein two of the first strain gauge and two of the second strain gauge are mounted to the detected base plate so as to structure a Wheatstone bridge, and the two first strain gauges are disposed at opposite sides, and the two second strain gauges are disposed at other opposite sides.

4. A tension detecting device detecting tension applied in a longitudinal direction of a belt, the device comprising:
 an elastically deformable member attached to the belt so as to elastically deform in accordance with tension when the tension is applied to the belt;
 a first strain detector mounted to the elastically deformable member, and outputting a signal corresponding to extension of the elastically deformable member in a direction of the tension when the tension is applied to the elastically deformable member; and
 a second strain detector mounted to the elastically deformable member, and outputting a signal corresponding to contraction of the elastically deformable member in the direction of the tension when the tension is applied to the elastically deformable member,
 wherein the tension detecting device detects the tension applied to the belt on the basis of outputs from the first strain detector and the second strain detector, and
 wherein the elastically deformable member has a region which extends and a region which contracts in the direction of the tension in accordance with the tension when the tension is applied in the longitudinal direction of the belt, and the first strain detector is mounted to the region which extends, and the second strain detector is mounted to the region which contracts.

5. The tension detecting device of claim 4, wherein the tension is detected on the basis of a difference in the outputs from the first strain detector and the second strain detector.

6. The tension detecting device of claim 4, wherein each of the first strain detector and the second strain detector include a pair of strain gauges, and the strain gauges structure a Wheatstone bridge.

7. The tension detecting device of claim 4, wherein the elastically deformable member is formed in a shape of a plate having thickness, and a hole passing through in a direction of thickness of the elastically deformable member is formed in the elastically deformable member, and the elastically deformable member has, at a position set apart from the hole, an attachment region to which the belt is attached, and an inner edge portion of the hole, which inner edge portion is at a side opposite the attachment region, has a surface which is engaged from an exterior when the tension is applied to the belt.

8. The tension detecting device of claim 7, wherein the first strain detector is mounted to a region of the elastically deformable member between the attachment region and the hole.

9. The tension detecting device of claim 7, wherein the second strain detector is mounted to a region of the elastically deformable member, which region is at a side of the hole opposite a side where the attachment region is located.

10. The tension detecting device of claim 7, wherein the elastically deformable member has a width orthogonal to a direction of application of the tension, and the width narrows between the attachment region and the hole, and the first strain detector is mounted to a region where the width narrows.

11. The tension detecting device of claim 7, wherein the inner edge portion has a projecting portion which projects in the direction of the tension toward an inner side of the hole, and the second strain detector is mounted to the projecting portion.

12. The tension detecting device of claim 7, wherein an engaged surface of the inner edge portion has two portions separate from one another, and the second strain detector has one pair of strain gauges, and the strain gauges are mounted so as to correspond to the two surfaces respectively.

* * * * *